US009836683B2

(12) United States Patent
Rizzo (10) Patent No.: US 9,836,683 B2
(45) Date of Patent: Dec. 5, 2017

(54) MICROELECTRONICS DEVICE WITH EXPOSED USER INTERFACES

(71) Applicant: GOOGLE INC., Mountain View, CA (US)

(72) Inventor: Dominic Rizzo, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/639,077

(22) Filed: Mar. 4, 2015

(65) Prior Publication Data
US 2016/0260006 A1  Sep. 8, 2016

(51) Int. Cl.
G06K 19/00 (2006.01)
G06K 19/077 (2006.01)
G06F 1/16 (2006.01)

(52) U.S. Cl.
CPC ..... G06K 19/07707 (2013.01); G06F 1/1613 (2013.01); G06F 1/1684 (2013.01); G06K 19/077 (2013.01); G06K 19/07705 (2013.01); G06K 19/07732 (2013.01)

(58) Field of Classification Search
USPC ........................................ 235/492
See application file for complete search history.

(56) References Cited

U.S. PATENT DOCUMENTS

| 7,260,247 | B2 * | 8/2007 | Kita | G06F 1/1613 382/124 |
|---|---|---|---|---|
| 7,664,902 | B1 | 2/2010 | Chow et al. | |
| 8,226,442 | B2 * | 7/2012 | Uusimaki | H01R 13/635 439/131 |
| 8,240,034 | B1 * | 8/2012 | Hiew | H01L 21/561 29/412 |
| 9,071,018 | B2 * | 6/2015 | Suh | H01R 13/62905 |
| 2005/0113025 | A1 * | 5/2005 | Akamatsu | H04N 1/00278 455/41.3 |
| 2008/0212291 | A1 | 9/2008 | Uusimaki et al. | |
| 2009/0070272 | A1 * | 3/2009 | Jain | G06K 19/07739 705/75 |

(Continued)

FOREIGN PATENT DOCUMENTS

| EP | 1 434 162 A2 | 6/2004 |
|---|---|---|
| EP | 2 192 523 A1 | 6/2010 |
| WO | 2007/066285 A2 | 6/2007 |

OTHER PUBLICATIONS

Friker, "International Search Report and Written Opinion issued in International Application No. PCT/US2016/020700", dated May 19, 2016, 12 pages.

(Continued)

Primary Examiner — Christle I Marshall
(74) Attorney, Agent, or Firm — Johnson, Marcou & Isaacs, LLC (57) ABSTRACT

An electronic device including an electronic assembly and an enclosure. The electronics assembly including a host interface and a direct user input interface. The direct user input interface remains exposed when the device is connected to a host via the host interface. The enclosure, substantially in the form factor of a microSD device, forms the outer boundary of the electronic device, overmolded on the electronics assembly.

17 Claims, 9 Drawing Sheets

(56) References Cited

U.S. PATENT DOCUMENTS

| | | | |
|---|---|---|---|
| 2010/0012721 A1* | 1/2010 | Jain | G06K 7/10237 235/380 |
| 2011/0137724 A1* | 6/2011 | Ramchandran | G06Q 30/02 705/14.49 |
| 2011/0277030 A1* | 11/2011 | Gillespie | G06F 21/34 726/17 |
| 2011/0281652 A1* | 11/2011 | Laverdiere | G06F 3/0219 463/37 |
| 2012/0074231 A1* | 3/2012 | Jain | G06K 7/10237 235/492 |
| 2013/0069223 A1 | 3/2013 | Chen | |
| 2014/0183269 A1* | 7/2014 | Glaser | G06F 21/32 235/492 |
| 2015/0132980 A1* | 5/2015 | Suh | H01R 13/62905 439/157 |

OTHER PUBLICATIONS

SD Association, "Activating New Mobile Services and Business Models with smartSD Memory cards", White Paper, Nov. 30, 2014, 20 pages.

\* cited by examiner

PRIOR ART

MICROELECTRONICS DEVICE WITH EXPOSED USER INTERFACES

TECHNICAL FIELD

The present disclosure relates to microelectronic devices. Example embodiments related to exposing interfaces, including a user interface, on a microelectronic device package intended to be installed in a host.

BACKGROUND

Secure Digital (SD™) refers to a standard maintained by the SD Association covering nonvolatile memory card technology. SD cards are used primarily in portable devices (known as "hosts") such as mobile phones, Global Positioning System (GPS) navigation devices, and digital cameras. The SD standard describes four performance-based families: SD Standard Capacity (SDSC™), SD High Capacity (SDHC™), SD eXtended-Capacity (SDXC™) and SD Input Output (SDIO™). The SD standard also describes three form factors of increasingly smaller size: SD, miniSD™, and microSD™. Electrically passive adapters allow a smaller card to fit and function in a device built for a larger card.

Cards in the SCSC, SDHC, and SDXC families are used as regular memory cards and offer increased capacity progressing through -SC to -HC to -XC. Cards in the SDIO family can provide input/output functionality, such as geolocation, radio and television reception, barcode reading, and external interfaces such as Wi-Fi and IrDA when the card is inserted into a host.

Figure 1:
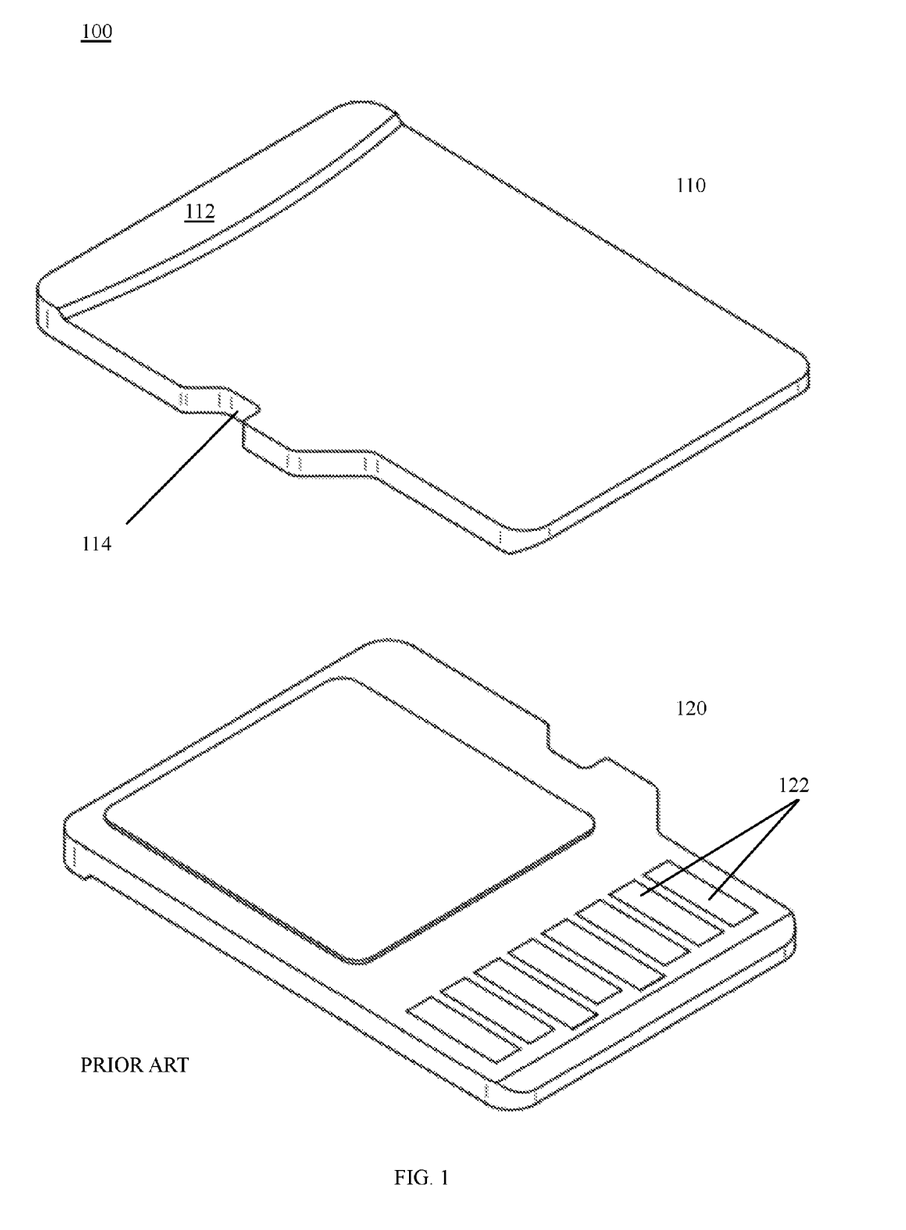
FIG. 1 presents two outline views of the form factor of a microSD card—a top perspective view, and a bottom perspective view (rotated 180 degrees away from the viewer about the long axis of the top perspective view).

FIG. 1 presents two outline views of the form factor of a microSD card 100—a top perspective view 110, and a bottom perspective view 120 (rotated 180 degrees away from the viewer about the long axis of the top perspective view 110). The overall dimensions of the microSD card are 15 mm long, by 11 mm wide, by 1 mm thick. Asymmetrical profiles on the long sides of the microSD card prevent inserting it in a host microSD slot upside down.

A thumb ridge 112 forms an arc concave to a first short side, in part to assist in removal of the card 100 from a host. Conductive electrical contacts 132 are exposed in the bottom view 120 proximate the second short side for electrical interface (both data communication and power) with a host. The notch 114 formed in one of the long sides interfaces with a corresponding retention device in the host to physically secure the card during operation.

Traditional thermoset plastic overmolding involves molding one thermoplastic material over another to form a single part. Traditional packaging of electronics includes a printed circuit board assembly containing passive and active elements, along with interface components inside a clamshell housing. A form of overmolding can be applied to electronics packages, eliminating the need for the clamshell housing. After creating a PCB assembly (PCBA), the PCBA can be inserted into a mold, and injected thermoset plastic can surround the PCBA. Properties of the thermoset plastic are chosen for various reasons, including to prevent inadvertent interactions with any of the materials being molded over, and to under fill electrical components such as flip chip devices. This approach can provide mechanical and moisture protection, vibration resistance; and also can reduce the number of manufacturing steps.

SUMMARY

In certain example aspects described herein, an electronic device includes an electronics assembly and an enclosure. The electronics assembly includes a host interface and a direct user input interface. The direct user input interface remains exposed when the device is connected to a host via the host interface. The enclosure, substantially in the form factor of a microSD device (for example, having host interface surfaces compatible with the microSD standard, but a longer body to accommodate user interfaces), forms the outer boundary of the electronic device, overmolded on the electronics assembly.

In some embodiments, the direct user input interface is a touch sensitive surface. In some such embodiments, the device is a trusted computing device. In some such embodiments, the device, when connected to a host via the host interface, is operative to execute a challenge-response protocol requiring user input to the touch sensitive surface as the response.

In some embodiments, the touch sensitive surface is a single surface. In some such embodiments, the single touch sensitive surface is located on or adjacent to the thumb ridge plateau of the microSD form factor. In some embodiments where a single touch sensitive surface is located on the thumb ridge plateau of the microSD form factor, at least one additional user interface is positioned beneath the touch sensitive surface. In some such embodiments, the additional user interface includes at least one of a light emitting diode (LED) and a transmit/receive Infrared Data Association (IrDA) interface.

In some embodiments, the touch sensitive surface includes multiple portions that are non-contiguous at the surface of the electronic device. In some such embodiments, each non-contiguous portion of the touch sensitive surface is a wire bond exposed by singulation of the device from a mirror symmetry device connected thereto during manufacture.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Turning now to the drawings, in which like numerals indicate like (but not necessarily identical) elements throughout the figures, example embodiments are described in detail.

Overview

Given the small form factor of microSD cards, limited space is available for non-radio frequency interfaces on the card surface, especially direct user interfaces. Direct user interfaces are those that do not require intermediate hardware or software to receive input from, or to present output to, a user. For example, an LED or a touch sensitive surface is a direct user interface.

Further, conventional clamshell enclosures may not be sufficient to protect the electronics of a microSD card, which can be subject to rough treatment outside the host. More specifically, certain user interface components, such as an LED or IrDA interface, can be subject to damage during manufacture. Additionally, manufacturing cost for incorporating components of interfaces that must be exposed may be prohibitive.

Example embodiments of the present technology include overmolded microSD card assemblies comprising both direct user interfaces and user input device interfaces that 1) remain exposed during microSD card operation, and that 2) do not extend significantly beyond the standard form factor of the microSD card.

Example Architectures

Figure 2:
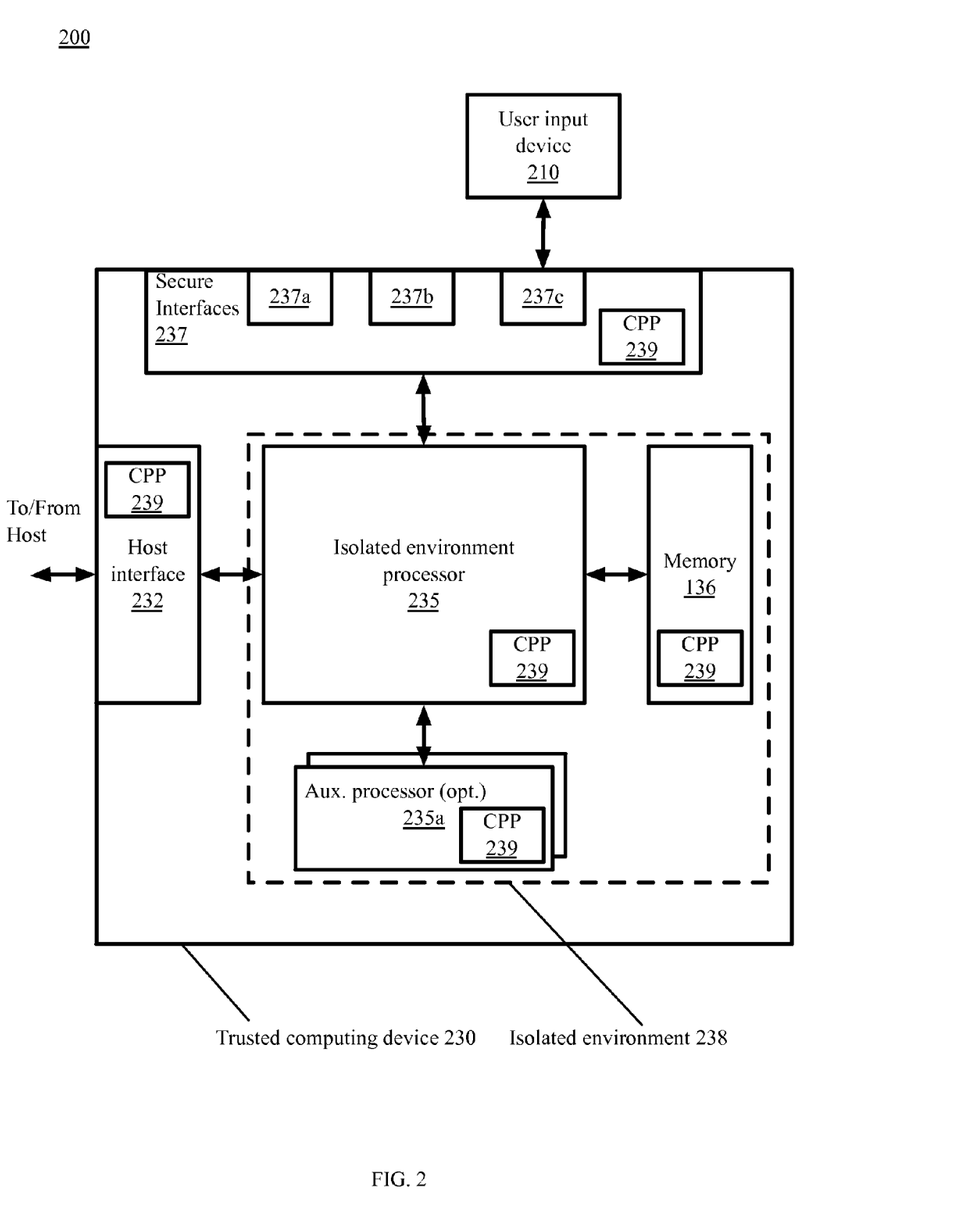
FIG. 2 is a block diagram depicting a trusted computing device, in accordance with certain example embodiments.

Consider, as an example use case of the present technology, a trusted computing device 230 implemented on a microSD card, such as shown in the block diagram 200 of FIG. 2. In such embodiments, the trusted computing device 230 includes an isolated environment 238, a host interface 232 (the primary interface), a plurality of user interfaces 237, and a computer program product 239 that is distributed across the components of the trusted device 230.

The isolated environment 238 includes an isolated environment processor 235, zero or more auxiliary processors 235a, and memory 236. The memory 236 is connected for data communication with the isolated environment processor 235. Each auxiliary processor 235a is connected for data communication with the isolated environment processor 235 and the memory 236. Each auxiliary processor 235a and the memory 236 communicate with the host outside the isolated environment 238 only through the isolated environment processor 235.

Each user interface 237 and the host interface 232 are in data communication with the isolated environment processor 235. The computer program product 239 includes non-transitory computer-readable media having computer-executable program instructions embodied thereon. When executed by the trusted computing device 230, the program instructions cause the trusted computing device 230 to perform a variety of trusted computing operations. The program instructions of the computer program product 239 can cause the trusted computing device 230 to provision itself, such as for cryptographic operations, in cooperation with an external device, such as user input device 210, via user interface 237. Using the program instructions of the computer program product 239, the trusted device 230 presents a first file system partition via the host interface 232 from the isolated environment processor 235.

In some embodiments of the trusted device 230, the user interfaces 237 can be used, in combination with the computer program product 239 and the isolated environment 238, for implementing a challenge-response protocol. In a challenge-response protocol, a "challenge" is presented that requires a valid "response" in order to proceed with a given activity. For example, in a trusted device 230 having a first user interface 237a including an light emitting diode (LED) visible to a user, and a second user interface 237b that responds to touch, program instructions of the computer program product 239 can be executed to illuminate the LED 237a, signaling to a user that the user must touch the second user interface 237b in order to proceed with a given activity of the trusted device 230. In some embodiments, the user interface 237b is a capacitive sensor that takes human body capacitance as input. In some embodiments, a resistive touch sensor or a piezoelectric touch sensor is used.

As another example use of a user interface 237, the user interface device 210 is in data communication with the isolated environment 238 via user interface 237c. Data communication between the user interface device 210 and the trusted device 230 can employ any one or a combination of a variety of connections (preferably wireless), including an Infrared Data Association (IrDA) link, a BLUETOOTH® wireless technology standard link, and a Near Field Communication (NFC) link. The trusted device 230 issues a challenge, such as lighting an LED on the user interface 237a on the trusted device 230 (a direct user interface), or sending a message to a display of user input device 210. The user may responds to the challenge using the user interface device 210. In some embodiments, the response is a fingerprint response input to the user interface device 210. In some embodiments, the response is an answer to an authentication question presented on a display of the user interface device 210. In some embodiments, the user interface device 210 can be a mobile communication device such as a mobile phone. In some embodiments, the user interface device 210 can be an NFC-enabled fob. In some embodiments, the response can be a direct user input to a touch sensitive user interface 237b.

Figure 3:
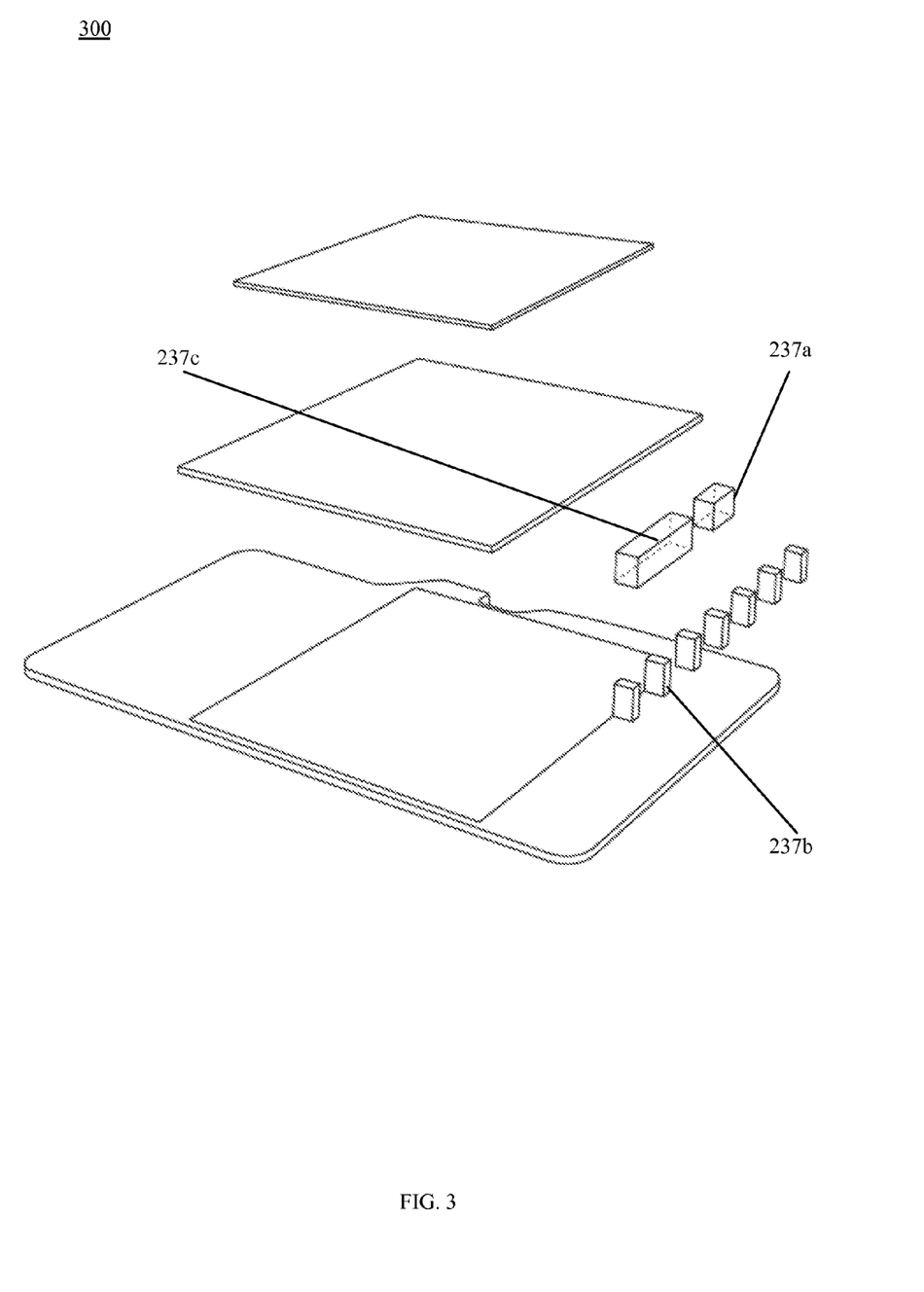
FIG. 3 is an exploded perspective view of a microSD card, in accordance with certain example embodiments.

Referring to FIG. 3, and continuing to refer to prior figures for context, an exploded view 300 of a notional PCBA of the example use case is shown. The view is a simplified version of the PCBA to emphasize placement of the user interfaces 237. Note that the contacts 122 of the host interface 232 are shown in the lowest layer of the exploded view 300. These contacts 122 will be partially exposed on the bottom of the device. An LED 237a constitutes the first user interface 237a. A series of conductive contacts for capacitive touch constitute the second user interface 237b. Both a transmit (Tx) IrDA and receive (Rx) IrDA diode constitute the third user interface 237c. While a series of discrete contacts 237b are shown, the third secure interface can be formed as one or more continuous contact surfaces.

Figure 4:
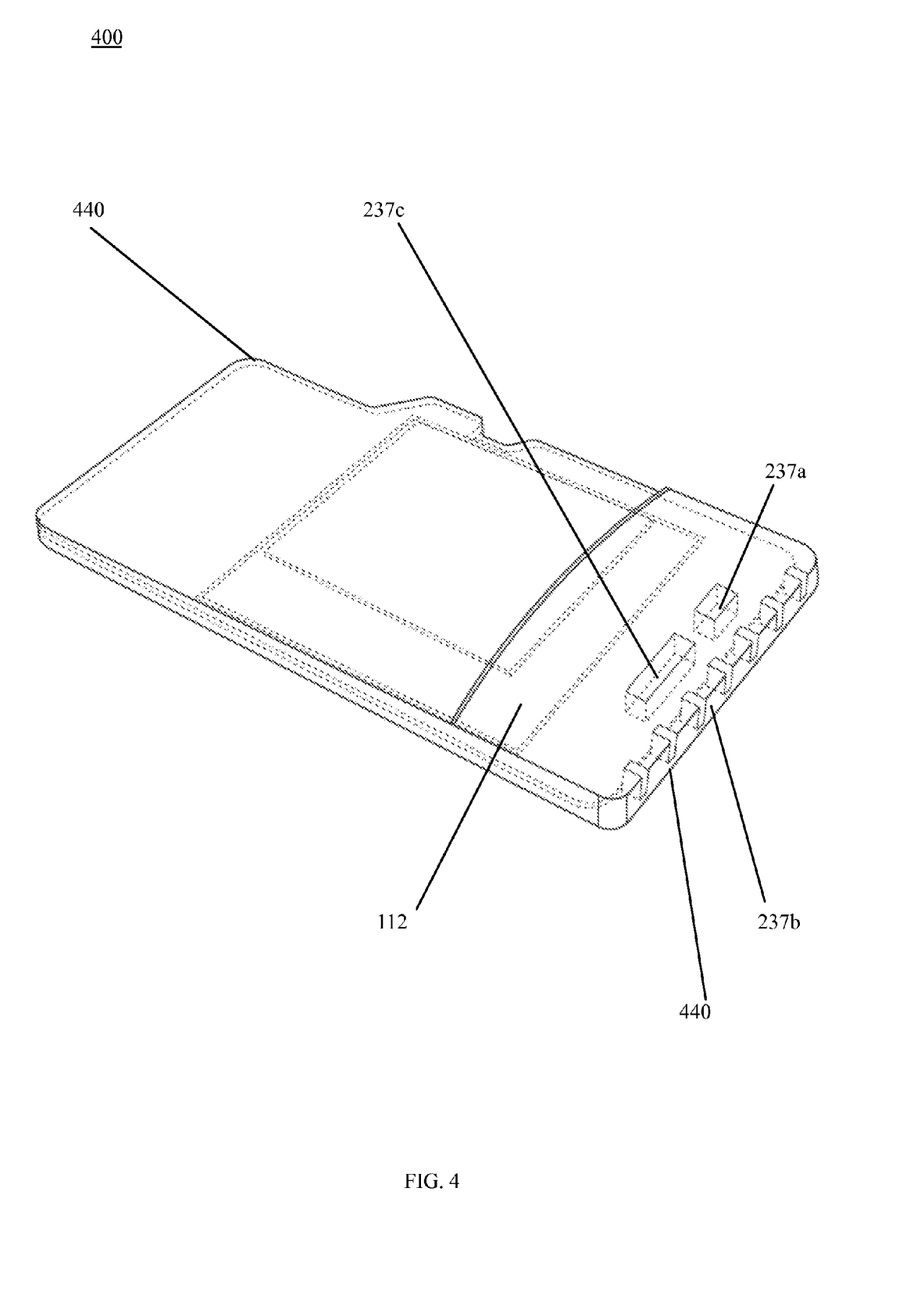
FIG. 4 is a top perspective view of a microSD card, in accordance with certain example embodiments.

Referring to FIG. 4, and continuing to refer to prior figures for context, a perspective view of an example completed trusted computing device 400 is shown with the outline of features, shown as dashed lines, that are hidden through overmolding (shown as solid lines 410 forming the outline of the microSD form factor trusted computing device 400). Note that the top surface of the Tx/Rx IrDA diode 237c and the top surface of the LED 237a are exposed on the plateau of the thumb ridge 112. Also note that each of the seven (7) touch contacts 237b are exposed both on the plateau of the thumb ridge 112 and on the short side face 440 proximate to the thumb ridge 112. The overmolding 410 protects the PCBA from moisture, shock, vibration, and impact damage, while exposing the user interfaces 237a, 237b, and 237c.

Figure 5:
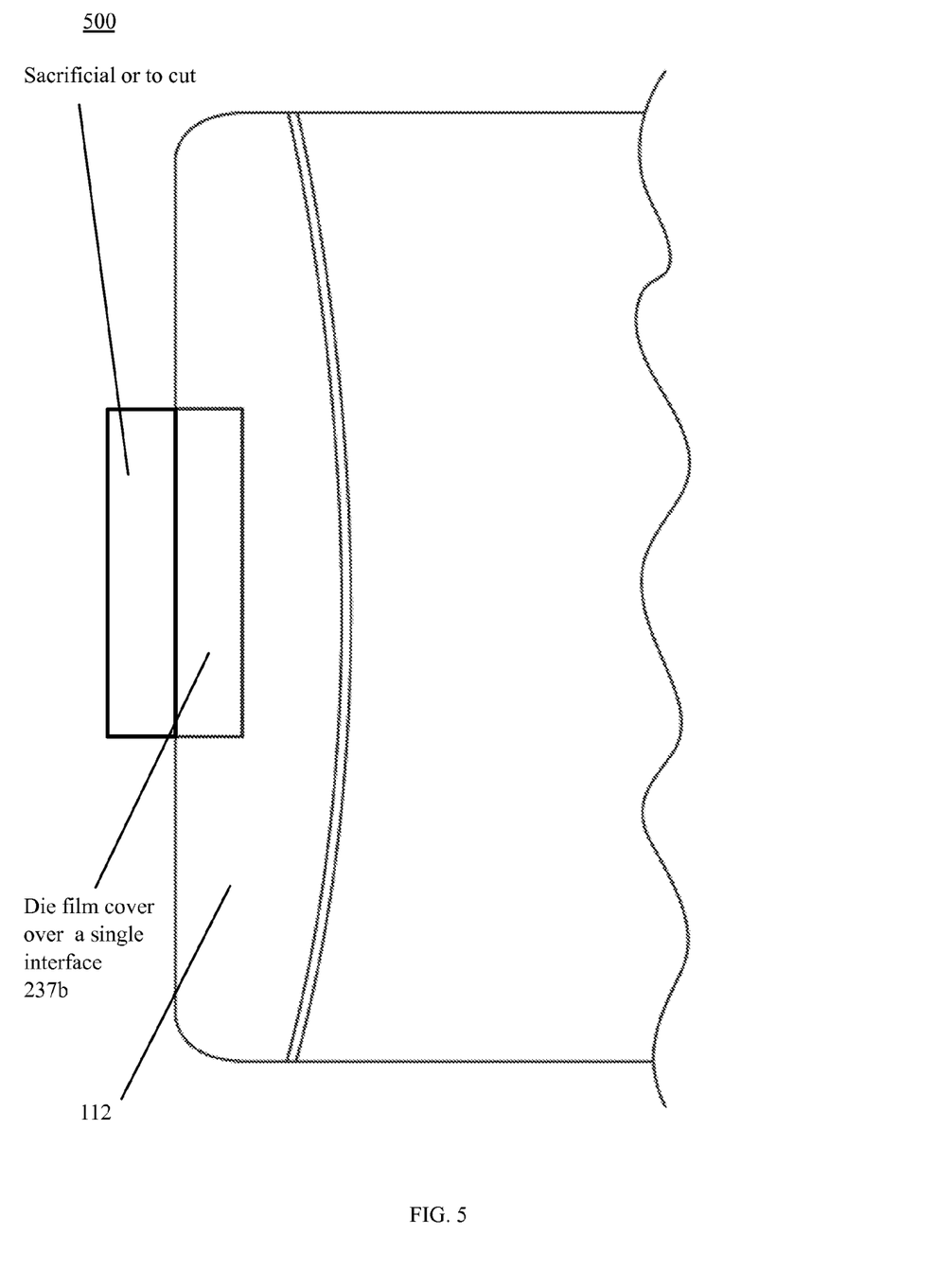
FIG. 5 is a partial view of the thumb ridge side of the top of a microSD card, in accordance with certain example embodiments.

Referring to FIG. 5, and continuing to refer to prior figures for context, a partial view of the thumb ridge 112 side of the top of a microSD card 500 in accordance with example embodiments of the present technology is shown. In such embodiments, die film assisted molding can be used to expose user interface 237b (shown as a single touch surface in FIG. 5).

Figure 6:
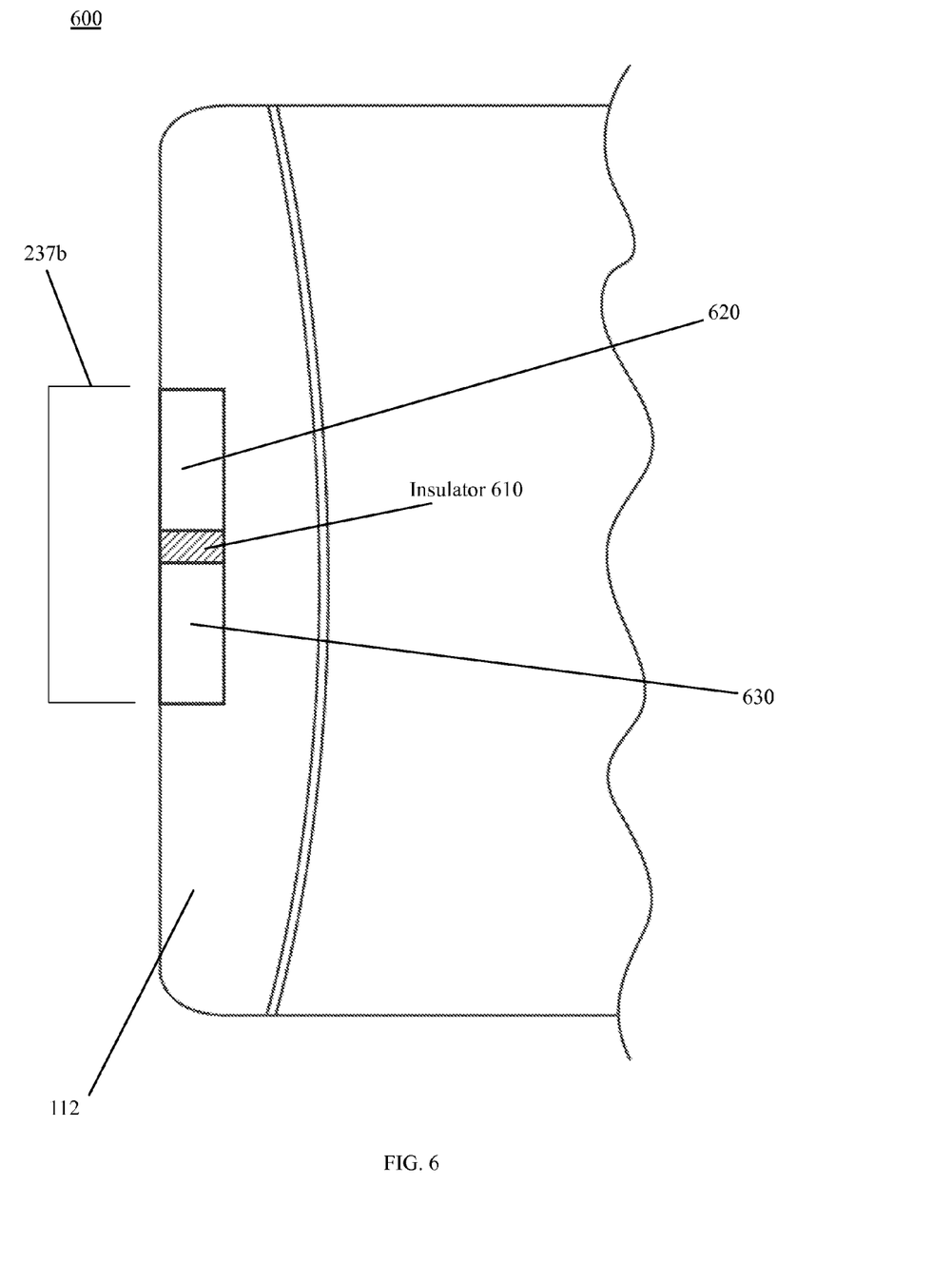
FIG. 6 is a partial view of the thumb ridge side of the top of a microSD card in accordance with certain example embodiments.

Referring to FIG. 6, and continuing to refer to prior figures for context, a partial view of the thumb ridge 112 side of the top of a microSD card 600 in accordance with example embodiments of the present technology is shown. In such embodiments, the exposed user touch interface 237b is formed by multiple touch-sensitive surfaces 620, 630 separated by an insulator 610. As with FIG. 5 die film assisted molding can be used to expose user interface 237b.

Figure 7:
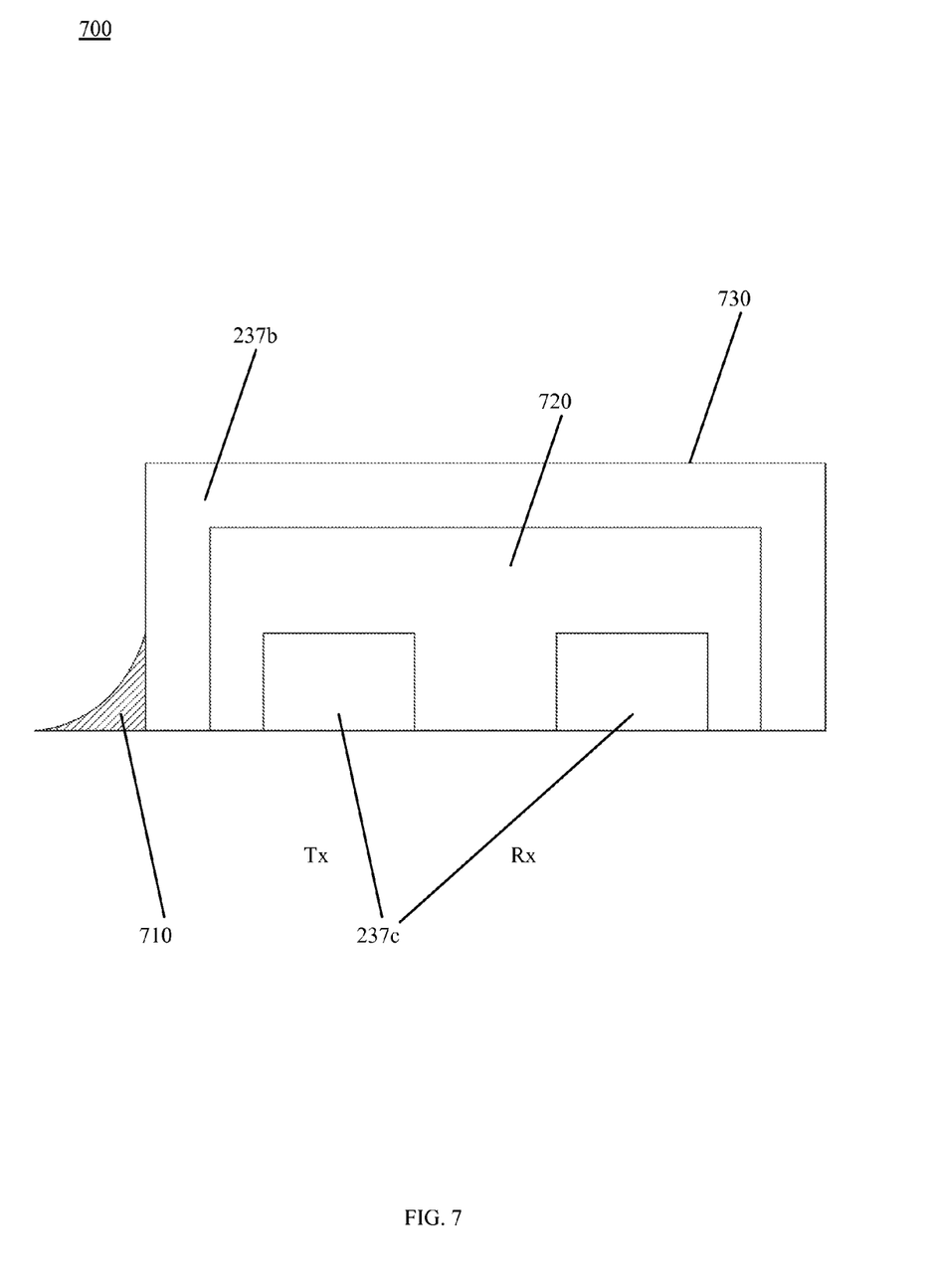
FIG. 7 illustrates a touch contact interface, along with transmit (Tx) and receive (Rx) infrared Data Association (IrDA) interface, in accordance with certain example embodiments.

Referring to FIG. 7, and continuing to refer to prior figures, a side view 700 of a Tx/Rx IrDA diode interface 237c protected by a touch contact interface 237b for an overmolded microSD card in accordance with example embodiments of the present technology is shown. In such embodiments, a single surface touch contact interface 237b is formed in an inverted "U" shape, with surface 730 being substantially flush with the thumbnail ridge 112 of the microSD device after overmolding has been completed. This surface 730 can be exposed via die film assisted molding on the top, and a sacrificial cut on the rear edge. Tx and Rx infrared diodes 237c are protected underneath the touch contact interface 237c—with the intervening space filled with epoxy 720 either post-mold or via transfer molding depending on the specific process parameters. In a variant to the approach of FIG. 7, the U-shaped structure can be interrupted along its top section by an insulator, similar to the approach shown in FIG. 6.

Figure 8:
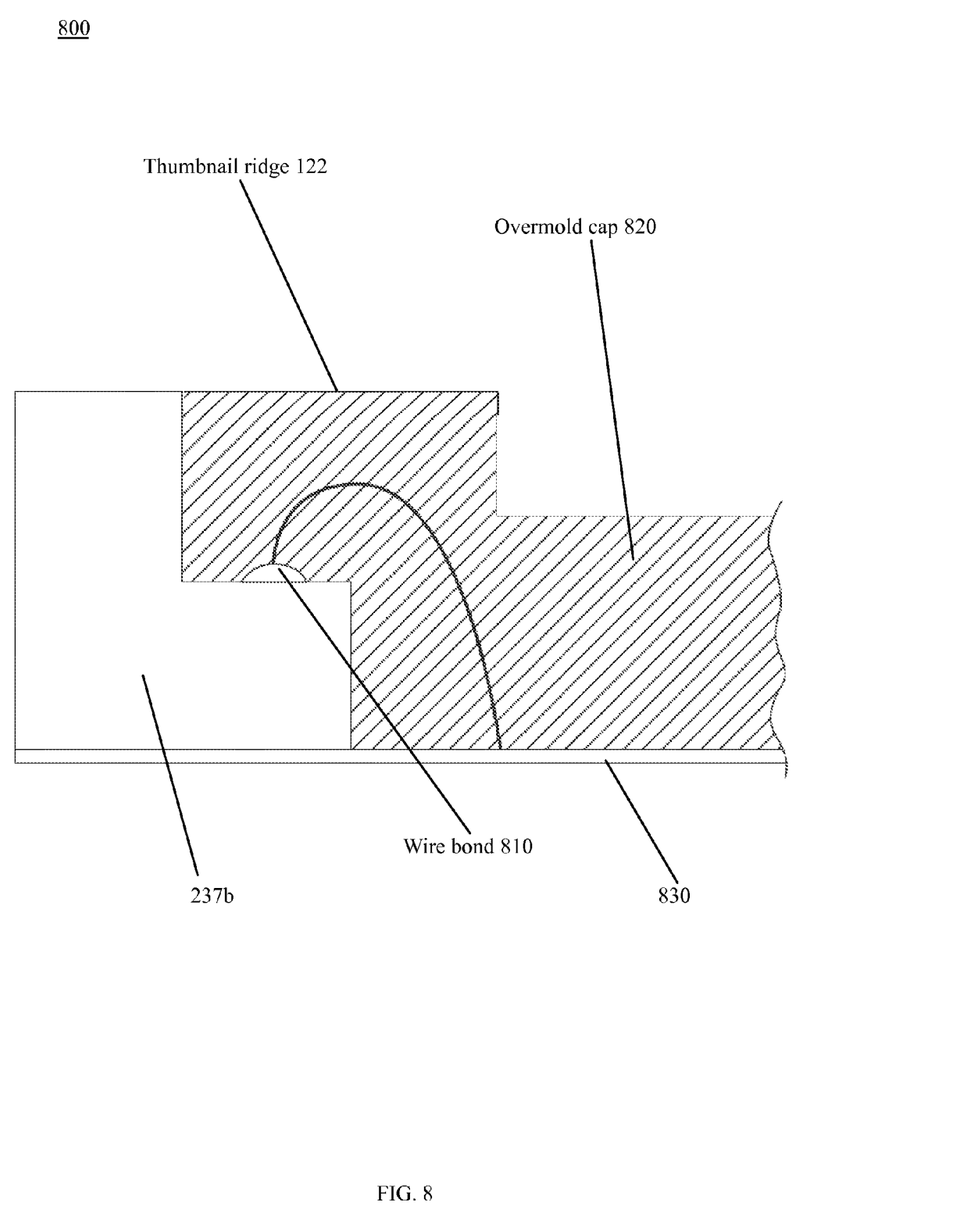
FIG. 8 illustrates a touch contact interface attached to a PCB using wire bond, in accordance with certain example embodiments.

Referring to FIG. 8, and continuing to refer to prior figures for context, a cross section of an overmolded microSD card 800 in accordance with example embodiments of the present technology is shown. The card 800 includes a stair step shaped touch contact interface 837c. In some embodiments, the touch contact interface can be attached to the PCB using epoxy, and then conductively connected using a wire bond 910. The overmold cap 820 would then be applied to protect the wire bond 810 connection. At least a portion of such a touch contact interface is exposed at the thumbnail ridge 122, and along the microSD card short side face 830 adjacent the thumbnail ridge 122. In another variation, the stair shaped touch contact interface 837c can be mounted to the PCB via surface mount technology (SMT) techniques.

In an additional variation, a subassembly integrating each of the interfaces (Tx/Rx IrDA, LED, and touch contact) 237 can be produced that can be wire bonded or surface mounted to the PCB.

In yet a further variation, where microSD cards of the present technology are manufactured in rows, with mirror symmetry across each pair of rows, sacrificial wire bonds across mirrored cards can be used. Corresponding cards on opposite sides of a row can be exposed during the singulation process. This approach has the advantage of the precision placement available with standard wire bond techniques. The same effect can be achieved using the lead frame manufacturing process.

Example Processes

Figure 9:
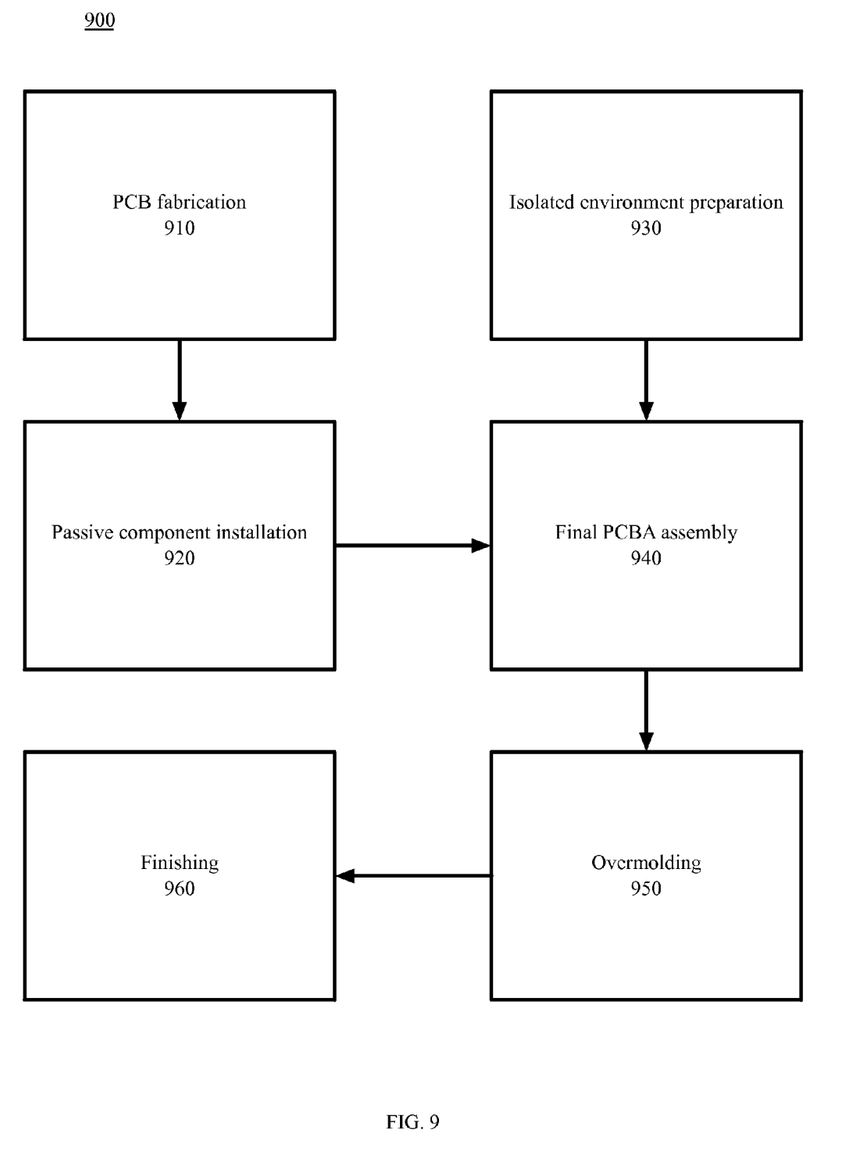
FIG. 9 is a block flow diagram depicting a method for preparing a microSD card, in accordance with certain example embodiments.

Referring to FIG. 9, a block flow diagram depicting a method 900 for preparing a microSD card, in accordance with certain example embodiments, is shown. A trusted computing device 230 in microSD card form, including an isolated environment 238, an LED 237a, an IrDA port 237c, and a touch interface 237b, is used as an example device.

While other methods can be used, a PCB can be fabricated by baking and screen printing, photoengraving, milling, or laser resist abrasion of interconnections—Block 910. In many instances, panelization, where a number of PCBs are grouped for manufacturing into a "panel," can be employed. The panels can be broken apart ("depaneling" or "singulation") through methods such as laser cutting.

Trusted computing device microSD card 230 PCBA assembly can begin with mounting and soldering circuit elements such as the host interface 232, LED 237a, IrDA port 237c, and touch interface 237b, along with miscellaneous other components to the fabricated PCB—Block 920. As an example, interface elements 237a, 237b, and 237c of FIG. 3 can be placed on the trusted computing device 230 PCB, and soldered into place.

In parallel to the processes represented by Block 910 and Block 920, the isolated environment 238 can be processed from a set of isolated environments, for example an array, fabricated on a silicon wafer—Block 930. This process results in an inspected singulated isolated environment 238 for integration into the trusted computing device 230 PCBA.

The complete PCBA can be assembled (Block 940) by physically mounting the isolated environment 238, for example, using epoxy, and the and electrically interconnecting the isolated environment 238, for example by wire bonding, to the PCBA.

At this point, assembled PCBAs can be placed in a mold array and overmolded—Block 950. For example, using the sacrificial wire bond approach for secure interfaces 237 described above, assembled PCBAs can be placed in rows, with mirror symmetry across each pair of rows, using sacrificial wire bonds across mirrored cards. A thermosetting plastic can be molded around the assembled PCBAs and cured.

Post-molding, the array of trusted computing devices 230 can be finished—Block 960. For example, after curing, and while still in the array, the devices can be marked. Then corresponding trusted computing device 230 micro SD cards on opposite sides of a row can separated. Where sacrificial wire bonds are used for the touch interface 237b, these can be exposed during the separation process. The individual trusted computing devices, with secure interfaces 237 exposed, can be chamfered, inspected, and tested.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the technology described herein.

Although specific embodiments have been described above in detail, the description is merely for purposes of illustration. It should be appreciated, therefore, that many aspects described above are not intended as required or essential elements unless explicitly stated otherwise.

For example, while a microSD form factor is used in example embodiments described above, other form factors can incorporate a direct user input and overmolding, along with non-contact interfaces protected by a contact interface as described herein. In some embodiments, the protection of non-contact interfaces under a contact interface is contemplated regardless of form factor or overmolding. In some embodiments, the form factor of the device can be an elongated microSD form factor, in part to accommodate user interfaces such as those described herein. In some embodiments, an interface assembly comprising a contiguous or non-contiguous contact interface protecting diode-based interfaces (for example an LED, an IrDA transceiver) can be assembled separately and epoxied/wire bonded or surface mounted to the device substrate.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. An electronic device, comprising:
    an electronics assembly comprising a host interface and a direct touch sensitive surface user input interface, wherein the direct touch sensitive surface user input interface remains exposed when the device is connected to a host via the host interface; and
    an enclosure, forming the outer boundary of the electronic device, overmolded on the electronics assembly, wherein the touch sensitive surface comprises multiple portions that are non-contiguous at the surface of the electronic device;
    wherein each non-contiguous portion of the touch sensitive surface comprises a wire bond exposed by singulation of the device from a mirror symmetry device connected thereto during manufacture.

2. The electronic device of claim 1, wherein the device is a trusted computing device.

3. The electronic device of claim 2, wherein the device, when connected to a host via the host interface, is operative to execute a challenge-response protocol requiring user input to the touch sensitive surface as the response.

4. The electronic device of claim 1, wherein the touch sensitive surface is a single surface.

5. The electronic device of claim 4, wherein the enclosure is substantially in the form factor of a microSD device, and the single touch sensitive surface is located at least one of on and adjacent to the thumb ridge plateau of the microSD form factor.

6. The electronic device of claim 4, wherein the enclosure is substantially in the form factor of a microSD device, and single touch sensitive surface is located on the thumb ridge plateau of the microSD form factor, and at least one additional user interface is positioned beneath the touch sensitive surface.

7. The electronic device of claim 6, wherein the at least one additional user interface comprises at least one of a light emitting diode (LED) and a transmit/receive Infrared Data Association (IrDA) interface.

8. A trusted computing device exposing a direct user input, prepared by the process:
    assembling an electronics assembly comprising:
        an isolated environment comprising an isolated environment processor and an auxiliary processor, wherein the auxiliary processor is connected for direct communication with only the isolated environment processor;
        a host interface connected for direct data communication with the isolated environment only through the isolated environment processor;
        a direct user input interface, wherein the direct user input interface remains exposed when the device is connected to a host via the host interface; and
        a computer program product comprising a non-transitory computer-readable media having computer-executable program instructions embodied thereon that, when executed by the trusted computing device, cause the trusted computing device to perform trusted computing, the computer-executable program instructions comprising computer-executable program instructions to perform trusted computing using the isolated environment, the host interface, and the direct user interface; and
    overmolding the electronics assembly to expose both the host interface, and to expose the direct user input.

9. The device of claim 8, wherein assembling comprises epoxying the direct user input interface to a printed circuit board assembly, and electrically connecting the direct user interface to the isolated environment using wire bonding.

10. The device of claim 8, wherein assembling comprises electrically connecting the direct user interface to the isolated environment using surface mount technology.

11. The device of claim 8, wherein the direct user input interface comprises a touch sensitive surface.

12. The device of claim 11, wherein the device is substantially in the form factor of a microSD device, and the touch sensitive surface is located at least one of on and adjacent to the thumb ridge plateau of the microSD form factor.

13. A process for manufacturing a trusted computing device, comprising:
    assembling an electronics assembly comprising:
        an isolated environment comprising an isolated environment processor and an auxiliary processor, wherein the auxiliary processor is connected for direct communication with only the isolated environment processor;
        a host interface connected for direct data communication with the isolated environment only through the isolated environment processor;
        a direct user input interface, wherein the direct user input interface remains exposed when the device is connected to a host via the host interface; and
        a computer program product comprising a non-transitory computer-readable media having computer-executable program instructions embodied thereon that, when executed by the trusted computing device, cause the trusted computing device to perform trusted computing, the computer-executable program instructions comprising computer-executable program instructions to perform trusted computing using the isolated environment, the host interface, and the direct user interface; and
    overmolding the electronics assembly to expose both the host interface, and to expose the direct user input at or adjacent to the thumb ridge plateau of the trusted computing device.

14. The process of claim 13, wherein assembling comprises epoxying the direct user input interface to a printed circuit board assembly, and electrically connecting the direct user interface to the isolated environment using wire bonding.

15. The process of claim 13, wherein assembling comprises electrically connecting the direct user interface to the isolated environment using surface mount technology.

16. The process of claim 13, wherein the direct user input interface comprises a touch sensitive surface.

17. The process of claim 16, wherein the trusted computing device is substantially in the form factor of a microSD device, and the touch sensitive surface is located at least one of on and adjacent to the thumb ridge plateau of the microSD form factor.

\* \* \* \* \*